April 15, 1941.   H. J. FINDLEY   2,238,585
AUTOMOBILE UNDERSEAT AIR CONDITIONING UNIT
Filed April 4, 1940   2 Sheets-Sheet 1
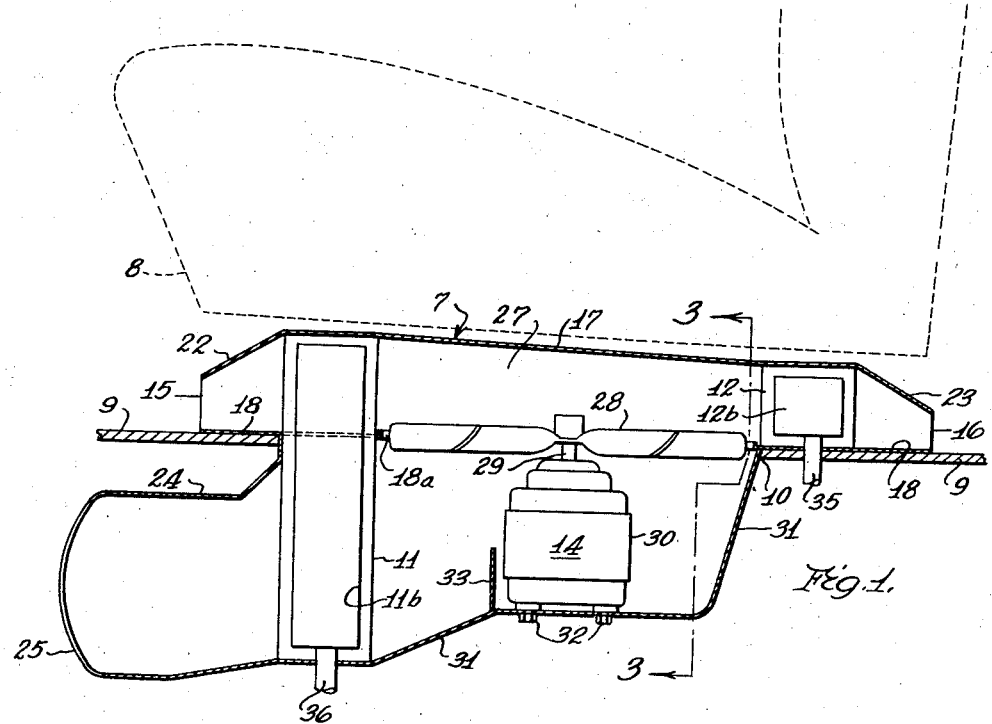
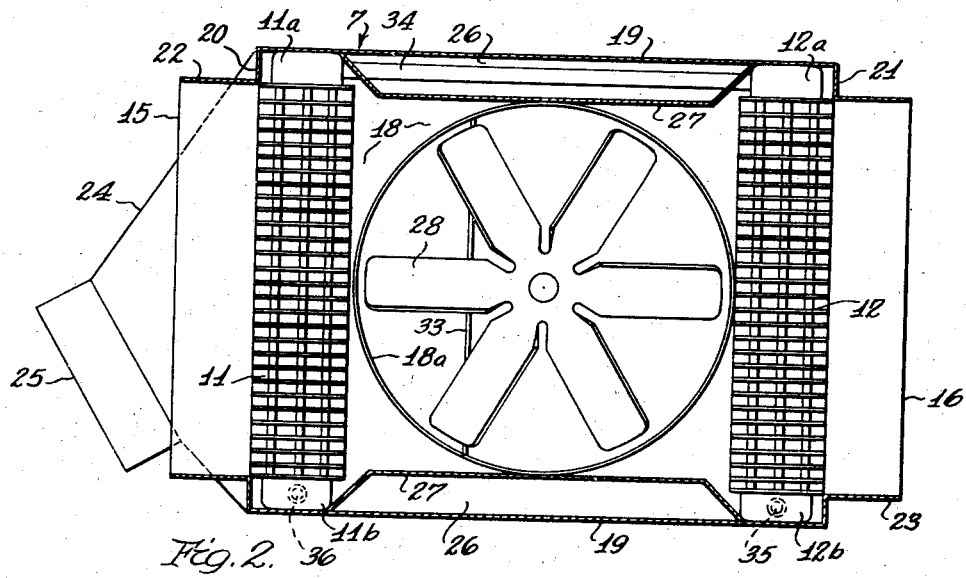
INVENTOR.
Howard J. Findley
BY John F. Stark
ATTORNEY.

April 15, 1941.  H. J. FINDLEY  2,238,585
AUTOMOBILE UNDERSEAT AIR CONDITIONING UNIT
Filed April 4, 1940  2 Sheets-Sheet 2

INVENTOR.
Howard J. Findley
BY John F. Stark
ATTORNEY.

Patented Apr. 15, 1941

2,238,585

UNITED STATES PATENT OFFICE 2,238,585

AUTOMOBILE UNDERSEAT AIR CONDITIONING UNIT

Howard J. Findley, Shaker Heights, Ohio, assignor to Eaton Manufacturing Company, Cleveland, Ohio, a corporation of Ohio Application April 4, 1940, Serial No. 327,748

11 Claims. (Cl. 237—12.3)

This invention relates to automobile body heaters in general and more particularly concerns a heater of the underseat type having a fresh air inlet and a recirculating air inlet so constructed and arranged that fresh air only is caused to pass through a heat-exchange core twice, or two cores, before being discharged directly to the front and rear compartments while recirculated air of the vehicle compartment makes only one pass through the heat-exchange core before delivery to said compartments.

Among the objects of the invention are the provision of an underseat heater casing having two or more heat-exchange cores therein and air impelling means for forcing or drawing air to be heated therethrough, including means for inducting fresh air from outside the vehicle and which is normally caused to make two passes through the heat-exchange cores before delivery directly to the front and/or rear compartments of the vehicle; the provision in a heater as above described including recirculated air inlets into the heater casing which necessitates only one pass of air through the heat-exchange cores before delivery directly to the vehicle compartments; the provision in an underseat heater casing as above described of heat-exchange means comprising a core of small heating capacity through which recirculated air is caused to pass and a core or cores of relatively larger heating capacity through which fresh air from outside the vehicle is normally caused to pass twice before delivery to the vehicle; the provision in a heater as above described of means for affording discharge of tempered fresh air through the core of smaller heating capacity and out of the recirculated air inlet openings concurrently, after an initial passage through the relatively larger heat-exchange core, directly to the vehicle compartment when the heater air impelling means is of insufficient capacity to handle and distribute in the normal manner the full volume of fresh air presented thereto under forward motion of the vehicle.

Another object of the invention is the provision of a vehicle heater or air-tempering means of the underseat type in which a casing, enveloping spaced heat-exchange cores of large and small capacity disposed adjacent tempered air discharge openings in spaced end walls thereof and including fresh and recirculated air inlet openings in its top and bottom walls, has a common air impelling means disposed between said cores and operable in conjunction with associated baffle members for dividing and conducting the combined air stream to the suction side of the fan for discharge through the heat-exchange cores directly to the vehicle compartments.

Further and other objects of the invention reside in the novel combination and arrangement of parts to be hereinafter disclosed, when considered in conjunction with the accompanying drawings forming a part of this specification and pointed out with particularity in the appended claims.

In the drawings like reference characters refer to corresponding parts throughout the several views, and in which:

Fig. 1 is a vertical longitudinal section through a preferred form of vehicle heater of the underseat type, showing the front seat of the vehicle overlying the same and embodying the teaching of this invention; and Fig. 2 is a sectional plan view of the same heater.

Underseat heaters or air-tempering units for automobile passenger compartment heating have heretofore been known, and more recently, the present trend in vehicle heating or cooling has been toward this direction for a number of reasons, chief of which has been that the centralized low position of the unit in the vehicle has afforded an adequate supply of tempered air to the front and rear compartments in the desired proportionate amounts, and obviates a more or less intense blast of tempered air on the passenger's feet in the front compartment of the vehicle, as in the conventional dash-mounted heater, while the occupants of the rear compartment suffered from untreated air. It is also well known to persons skilled in this art that the available free area under the front seat of present day vehicles is very limited and for this reason units used in this location have employed various means for utilizing the area under the seat to the best advantage to secure the desired results, such as embodying cores of unequal size and inclining the axis of rotation of the air impelling means to favor the core of the greatest air-tempering capacity to secure the desired proportionate volume of tempered air to different areas or compartments of the vehicle. It is also further known to employ an inlet for fresh air from outside the vehicle to units of this general type. However, to the best of applicant's knowledge, heretofore no heater or air-tempering unit has been constructed employing or embodying the combination and arrangement of parts taught by this invention, as about to be disclosed. Accordingly, to this end, the heater or air-tempering unit of the present invention is believed to cover a new and novel construction of the specific type shown.

Figure 3:
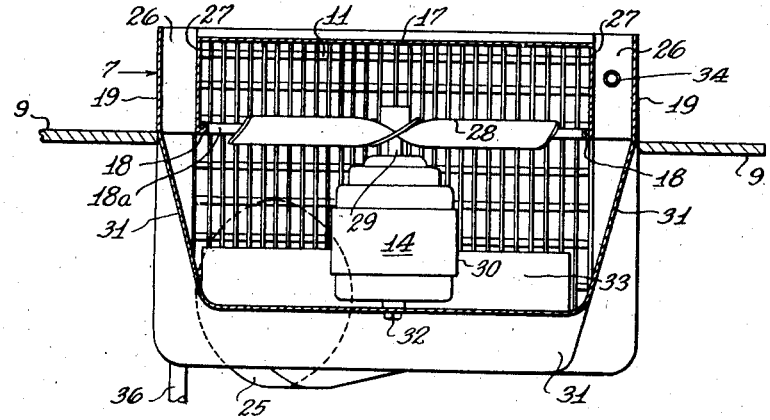
Fig. 3 is a vertical sectional view through the heater of Fig. 1 taken substantially on the line 3—3 thereof.

Now having reference to Figs. 1 through 3 to the drawings, there have been shown several views of a preferred form of novel heat-exchange structure constructed according to this invention and providing fresh and recirculated air inlet openings and spaced heat-exchange cores, one of which normally receives two passes of fresh outside air therethrough before discharge directly to the passenger compartment. In the drawings, the number 7 generally designates a casing for an underseat heat-exchanger which is disposed between an overlying seat 8 of the vehicle, shown in dotted lines, and the underlying floor 9 thereof upon which the heat-exchanger casing 7 is supported and extends partially through an opening 10 therein. The heat-exchange casing 7 has heat-exchange cores 11 and 12 therein and an air impelling means 14 for use in causing fresh and recirculated air to be tempered to flow through the cores and to be delivered in separate streams directly to the front and rear compartments through spaced discharge openings 15 and 16. The casing 7 may be a hollow sheet metal structure formed of one or more parts and of generally quadrangular shape in plan view. As here shown, the casing may comprise top and bottom walls 17 and 18, a pair of spaced side walls 19, and a pair of spaced end walls 20 and 21. The top wall 17 of the heat-exchange casing is inclined at a slight angle toward the rear of the vehicle so as to fit the slope of the lower side of the seat 8, thus utilizing all available free area under the seat, and terminates in depressed hooded sections 22 and 23 produced beyond the adjacent cores 11 and 12 respectively, to conduct the tempered air discharge to the vehicle compartments beyond the overhang of the seat 8, and which define in part the discharge openings 15 and 16 in the end walls 20 and 21.

It is usually desirable to supply fresh air from outside the vehicle in addition to recirculated air, which is circulated through the heat-exchange casing and the vehicle compartments, in order to replenish air which has become vitiated and reduce the relative humidity of the vehicle air which in some instances has a tendency to cause fogging or steaming of the windows. However, in previous heat-exchangers of this general type, difficulty has been experienced in obtaining the proper amount, and quality and degree of tempering of the fresh air supply to an underseat heater including simple and efficient means for blending and proportioning the fresh and recirculated tempered air delivery to the vehicle compartments, but, as will be presently seen, the novel form and construction of this heat-exchanger provides this desired amount, tempering and blending of fresh and recirculated air and also enables the heat-exchanger to be readily installed under the front seat.

In order that the casing 7 may be capable of supplying the desired volume, tempering and blending of fresh and recirculated air in larger quantities to the front compartment, and may better utilize the space available beneath the front seat 8, the casing and heat-exchange cores of the unit are constructed so that streams of tempered air of the desired proportional blending and relative degree of tempering or heat content will be supplied to the front and rear compartments. To this end, the casing 7 is constructed with the end wall 20 thereof, which is nearest the front compartment of the vehicle, relatively higher and deeper than the rear end wall 21 and made so that the discharge openings 15 and 16 of these end walls are of corresponding relatively large and small height or size. The end wall 20 of the heat-exchange casing also has a tapered duct or shroud 24 in communication with the interior thereof adjacent its lower end below the floor 9 and terminates in a relatively large circular inlet opening 25 at its outer end for reception of fresh air from outside the vehicle. From the inlet opening 25 a conduit may be extended along the vehicle frame channel (not shown) to the rear face of the radiator grille where fresh air may be inducted thereinto in response to forward motion of the vehicle. This location of the fresh air intake is desirable because it provides the best location for reception of air in an uncontaminated condition, and without dust and road splash which may be present in an intake similarly used under the vehicle floor. The heat-exchange cores 11 and 12 are of large and small size, or heat-exchange capacity, and arranged in spaced relation in the casing 7 with the larger core 11 adjacent the larger discharge opening 15 and the communication of the fresh air shroud or duct 24, and the small core 12 adjacent the smaller discharge opening 16. With this relative arrangement of heat-exchange cores, and air inlet and discharge openings, as just described, it will be seen that the larger core is approximately three times the smaller core and projects through the opening 10 in the vehicle floor 9 while the smaller core rests upon the floor; and that fresh air inducted through the shroud or tapered duct must make an initial pass through the lower air passages in the core 11 upon entering the heat-exchange casing and a second pass back through the upper air passages of the core 11 before delivery to the front vehicle compartment, or out through the smaller core 12 to the rear compartment. Obviously, of course, if desired the larger core 11 could be divided and consist of two spaced cores connected in series in the same manner cores 11 and 12 are joined. In this event there would be three cores some of which could be of equal size and interchangeable thus simplifying manufacturing costs.

In addition to the fresh air forced into the vehicle under forward motion thereof through the inlet opening 25, of the shroud 24, recirculated air of the vehicle compartments may be drawn into or supplied to the casing 7 at one or more points. In this instance, the top wall 17 of the casing is shown provided with a pair of intake openings 26 formed therein, located between the heat-exchange cores 11 and 12 and adjacent each of the side walls 19. Inner walls 27, parallel and spaced from side walls 19, define the sides of the recirculated air inlet channels and extend from adjacent the top wall 17 to the bottom wall 18 of the casing so as to conduct recirculated air below the fan 38 of the air impelling means 14, located between the heat-exchange cores 11 and 12 in a circular flanged opening 18a in the bottom casing wall 18, to the suction side of the fan and which operates for drawing recirculated air into the casing and discharging the same in two separate streams through the cores 11 and 12 and discharge openings 15 and 16 adjacent thereto. The fan 28 may be mounted directly on a shaft 29 of an electric motor 30. This motor may be suitably supported on the casing 7 at a point between the cores 11 and 12; and, in this instance, is shown by a deep pan 31 which extends from the bottom wall 18 of the casing through the opening 10 in the vehicle floor 9 and in which the motor rests. The motor may be secured in this pan by suitable bolts 32, so as to position the fan in the circular flanged opening 18a, of the bottom wall 18 of the casing where it may receive the fresh air delivery from the inlet 25 and be above the inner end of the recirculated air inlets 26. It will be understood that the deep pan 31 may be secured to the lower wall 18 of the casing and is of sufficient cross-dimensions to envelope the lower margins of the larger core 11 below the floor level and temporarily retain the fresh air forced or drawn therethrough until it is supplied to the fan. A baffle member 33 supported upon the lower wall of the pan 31 extends from side to side thereof, as best shown in Fig. 3, and breaks up the fresh air delivery to the heat-exchange casing so as to cause the fan to divert portions thereof to each heat-exchange core 11 and 12.

It will be seen that the heat-exchange casing 7 may be readily installed in an automobile because only one large hole 10 need be cut in the floor, to accommodate the deep pan-like projection 31 including the large core 11 depending down thereinto, the fresh air shroud 24 connected thereto, and the electric motor 30 mounted therein. Since access can be readily had to the compartment floor at the point where this hole is to be cut, the cutting may be done by means of a hack saw, and hence laborious and costly installation operations can be avoided.

The heat-exchange cores 11 and 12 may be of the usual type of construction, that is to say, they may be finned tube structures having numerous air passages for the air to be tempered in passing therethrough and having header tanks thereon. The tanks of the core 11 are designated 11a and 11b and the tanks of the core 12 are designated 12a and 12b.

Heating or cooling medium such as hot or cold water taken from the engine cooling system may be circulated through the heat-exchange cores 11 and 12 for tempering the air which is drawn or forced through the cores by the fan 30. Although the heating or cooling medium may be supplied to both cores simultaneously, that is to say in parallel relation to each other, it is preferable to circulate the heated or cooled medium through the cores in series with each other and with the hotter or colder medium passing first through the smaller core 12 and then through the larger core 11. This desired series circulation of the heating or cooling medium may be obtained by connecting the tanks 11a and 12a of the cores 11 and 12 by the pipe 34 and by connecting supply and return pipes 35 and 36 respectively, with the tanks 12b and 11b of the cores 12 and 11. This series circulation of the heating or cooling medium through the cores 11 and 12 is desirable in this instance because it causes the hotter or colder medium to be supplied first to the core having the smaller heat-exchange, in this instance the core 12 which tempers the stream of air to be supplied to the rear compartment. In this way only a portion of the air-tempering of the supplied medium will be removed in the core 12 for delivery to the rear compartment, and the temperature and heat-exchange content of the medium will still be relatively large when it is supplied to the core 11 for tempering the fresh outside air initially passed therethrough and then partially repassed back when being delivered into the front compartment.

Figure 4:
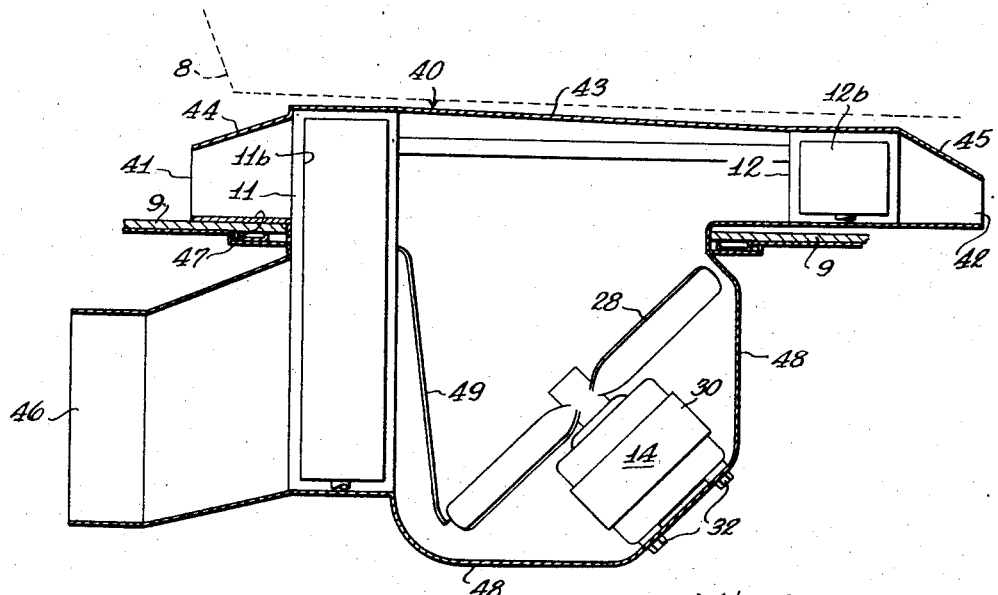
Fig. 4 is a vertical longitudinal section through an underseat heater somewhat similar to Fig. 1 but illustrating a slightly modified form thereof.

In Fig. 4 there is shown a slightly modified form of this heat-exchanger, in which provision is made for a more economical use of the space under the floor by tilting the air impelling means 14 at an angle, as well as a modified baffle arrangement to direct the fresh air supply to the suction side of the fan 28 mounted on the shaft of an electric motor 30 of the air impelling means 14. As shown in Fig. 4, this modified form of heat-exchanger may comprise a casing 40 having large and small discharge openings 41 and 42 in its end walls and heat-exchange cores 11 and 12 of corresponding large and small size or capacity located adjacent such openings. The sloping top wall 43 of the casing has extended hooded sections 44 and 45 over the large and small discharge openings 41 and 42 to conduct the tempered air delivery out beyond the overhang of the seat 8, all as previously described for the first heat-exchanger. The larger core 11 extends vertically through the floor 9 and is disposed transversely across a fresh air inlet opening 46. The bottom wall 47 may have a lower deep drawn pan or shell 48 portion extending through an opening 10 in the floor 9, to confine fresh air forced into the lower shell 48 and collect recirculated air supplied thereto, in the manner as previously described for the foregoing heater. However, in this instance, one corner of the lower shell or pan 48 is angularly inclined and faces the larger core 11 so as to provide a support for the air impelling means 14, secured thereto by bolts 32, and mounting a fan 28 on the electric motor 30.

In order to keep the fan from counteracting the fresh air supply and to divide the same up, a baffle member 49 extends across the inner face of the core 11 and is inclined at an angle thereto to divert the fresh air delivery behind the fan 28 to the suction side thereof, wherefrom the fan will force tempered fresh air through the upper passages of the core 11 above the floor level and the core 12 directly to the vehicle compartments. Otherwise the functions and operations of this heat-exchanger are the same as the previously described construction, including the attendant advantages thereof.

In the operation of either of these heat-exchangers above described, fresh air is forced into the heat-exchange casing inlet opening therefor in response to forward motion of the vehicle, or drawn in by the fan when the vehicle is at rest, and makes an initial heat transfer through the lower air passages of the larger core into the casing where a baffle member directs or splits up the partially tempered fresh air delivery so as to distribute the same to the fan to be discharged to each heat-exchange core for delivery directly to the vehicle compartments. Recirculated air of the vehicle is drawn into the casing through inlet openings provided for that purpose and is also directed to the suction side of the fan; the recirculated and fresh air becoming blended in the wind box around the suction side of the fan and discharged in streams through the cores to front and rear compartments of the automobile.

In some conditions of operation of the automobile when the static head of fresh air forced through the lower section of the larger core becomes too great for the fan to handle the excess quantities thereof will be forced through the recirculated air inlets directly to the vehicle body after having been only partially tempered by one pass through larger core. This phase of operation affords a means for auxiliary heating on mildly cold days during which time the motor need not be run and the drain on the electrical system of the vehicle lessened. When the air impelling means being operated, and under the above conditions, the partially tempered fresh air provides an automatic balance against the vehicle windows becoming fogged or steamed by regular tempered air delivery from the heater which may, under certain conditions, be too humid. If on the other hand the fan, due to having a capacity for air movement greater than the diameter of the fresh air intake, is starved because of no forward motion of the vehicle it automatically makes up for this deficiency by obtaining the desired portion of its air through the recirculated air inlet opening.

From the foregoing description and accompanying drawings it will now be readily seen that there has been provided an improved construction and arrangement for an automobile heater or air-tempering unit of the underseat type, accomplishing, among other things, the objects and advantages of the invention first enumerated. While there has been illustrated and described an improved underseat unit in somewhat detailed manner by specific embodiments thereof, it is not the intention to be limited to the precise constructions and arrangements disclosed, but regard this invention as including such changes and modifications as do not constitute a departure from the spirit of the invention as set forth in the scope of the following claims.

What I claim is:

1. An automobile air-conditioning unit comprising a casing having walls including an end and top walls provided with fresh and recirculated air inlet openings and said end wall with a wall opposite thereto provided with air discharge openings, a pair of spaced heat-exchange cores in the casing adjacent said discharge openings with one of said cores extended adjacent said fresh air inlet opening, and air-impelling means between the cores operable to deliver blended streams of fresh and recirculated air in separate streams through the cores and adjacent discharge openings.

2. An automobile air-conditioning unit comprising a casing having walls including an end and top walls provided with fresh and recirculated air inlet openings and said end wall with a wall opposite thereto provided with air discharge openings, a pair of spaced heat-exchange cores in the casing adjacent said discharge openings with one of said cores having greater air-tempering capacity and extended adjacent said fresh air inlet opening, air impelling means between the cores operable to deliver blended streams of fresh and recirculated air in separate streams through the cores and adjacent discharge openings, and means for passing heating or cooling medium through said cores in series with the heating or cooling medium passing through the core of lesser air-tempering capacity first.

3. A vehicle air-conditioning unit comprising a pair of spaced heat-exchange cores of unlike size and air-tempering capacity, a casing enveloping said cores and having air discharge outlets adjacent thereto and including air inlet openings adjacent said larger core and between said spaced cores respectively, and a rotatable air impeller operable to draw air through the inlet openings adjacent said larger core and between said pair of cores respectively, and force the same in separate streams through portions of said cores adjacent said discharge openings.

4. An underseat unit for air-tempering the interior of an automobile having front and rear compartments and a seat therebetween spaced above the floor, comprising a casing adapted to be located between the seat and floor with a portion thereof extending therebelow and having side, top and bottom walls and also high and low end walls provided with openings for discharging air directly to said front and rear compartments, spaced heat-exchange cores of large and small air-tempering capacities disposed adjacent said high and low walls, respectively, with said larger core extending a distance below said floor adjacent an end wall of the casing therebelow, air impelling means in the casing between said cores and operable to discharge streams of air through the cores to the respective compartments, said top and end walls being provided with openings for admitting recirculated air to the casing from the interior of the automobile and fresh air to the casing from outside the automobile.

5. An underseat unit for air-tempering the interior of an automobile having front and rear compartments and a seat therebetween spaced above the floor, comprising a casing adapted to be located between the seat and floor with a portion thereof extending therebelow and having side, top and bottom walls and also high and low end walls provided with openings for discharging air directly to said front and rear compartments, spaced heat-exchange cores of unequal air-tempering capacities disposed adjacent said high and low walls, respectively, with one core disposed below said floor adjacent an end wall of the casing therebelow, air impelling means in the casing between said cores and operable to discharge streams of air through the cores to the respective compartments, said top and end walls being provided with openings for admitting recirculated air to the casing from the interior of the automobile and fresh air to the casing from outside the automobile, and said fresh air being initially passed through one of said cores disposed adjacent the said inlet opening formed in the end wall.

6. An underseat unit for air-tempering the interior of an automobile having front and rear compartments and a seat therebetween spaced above the floor, comprising a casing adapted to be located between the seat and floor with a portion thereof extending therebelow and having side, top and bottom walls and also high and low end walls provided with openings for discharging air directly to said front and rear compartments, spaced heat-exchange cores of large and small air-tempering capacities disposed adjacent said high and low walls, respectively, with said larger core extending a distance below said floor adjacent an end wall of the casing therebelow, air impelling means in the casing between said cores and operable to discharge streams of air through the cores to the respective compartments, said top and end walls being provided with openings for admitting recirculated air to the casing from the interior of the automobile and fresh air to the casing from outside the automobile, and means within the casing for dividing up the partially tempered fresh air supply so as to cause said air impelling means to divert a portion to each heat-exchange core.

7. An underseat unit for air-tempering the interior of an automobile having front and rear compartments and a seat therebetween spaced above the floor, comprising a casing adapted to be located between the seat and floor with a portion thereof extending therebelow and having side, top and bottom walls and also high and low end walls provided with openings for discharging air directly to said front and rear compartments, spaced heat-exchange cores of large and small air-tempering capacities disposed adjacent said high and low walls, respectively, with said larger core extending a distance below said floor adjacent an end wall of the casing therebelow, air impelling means in the casing between said cores and operable to discharge streams of air through the cores to the respective compartments, said top and end walls being provided with openings for admitting recirculated air to the casing from the interior of the automobile and fresh air to the casing from outside the automobile, and means within the casing for dividing up the partially tempered fresh air supply so as to cause said air impelling means to divert a portion of each heat-exchange core, with a larger portion being diverted to the heat-exchange core of large tempering capacity.

8. An underseat unit for air-tempering the interior of an automobile having front and rear compartments and a seat therebetween spaced above the floor, comprising a casing adapted to be located between the seat and floor with a portion thereof extending therebelow and having side, top and bottom walls and also high and low end walls provided with openings for discharging air directly to said front and rear compartments, spaced heat-exchange cores of large and small air-tempering capacities disposed adjacent said high and low walls, respectively, with said larger core extending a distance below said floor adjacent an end wall of the casing therebelow, air impelling means in the casing between said cores and operable to discharge streams of air through the cores to the respective compartments, said top and end walls being provided with openings for admitting recirculated air to the casing from the interior of the automobile and fresh air to the casing from outside the automobile, and means within the casing for conducting recirculated air to the suction side of said air impelling means including means for dividing up the partially tempered fresh air supplied to the air impelling means so to cause a portion of partially tempered fresh air and untreated recirculated air to be blended and diverted thereby to each heat-exchange core for delivery to said vehicle compartments.

9. An underseat unit for air-tempering the interior of an automobile having front and rear compartments and a seat therebetween spaced above the floor, comprising a casing adapted to be located between the seat and floor with a portion thereof extending therebelow and having side, top and bottom walls and also high and low end walls provided with openings for discharging air directly to said front and rear compartments, spaced heat-exchange cores of large and small air-tempering capacities disposed adjacent said high and low walls, respectively, with said larger core extending a distance below said floor adjacent an end wall of the casing therebelow, air impelling means in the casing between said cores and operable to discharge streams of air through the cores to the respective compartments, said top and end walls being provided with openings for admitting recirculated air to the casing from the interior of the automobile and fresh air to the casing from outside the automobile, said fresh air being initially passed through the lower section of said larger core disposed adjacent the said inlet opening formed in the end wall, and said fresh and recirculated air inlet openings so constructed and arranged that when the static head of tempered fresh air supplied to the air impelling means in response to forward motion of the automobile exceeds the capacity of the air impeller excess quantities thereof will be forced through said recirculated air inlet openings to the vehicle compartments.

10. An underseat unit for air-tempering the interior of an automobile having front and rear compartments and a seat therebetween spaced above the floor, comprising a casing adapted to be located in part between the seat and floor with a bottom portion below the floor provided with an end wall opening therein for reception of fresh air to said casing and having side and top walls above the floor and also end walls provided with openings for discharging air directly to said front and rear compartments, a pair of spaced heat-exchange cores adjacent said end wall openings including one of said cores having a greater air-tempering capacity than the other and extended below said floor and adjacent said end wall fresh air inlet opening therein, apertured plate means dividing the casing portions above and below the vehicle floor for communicating the fresh air inlet with the heat-exchange cores providing a passage extending through said floor to the space between said cores, and air impelling means between said cores for reception of fresh air forced through the lower portion of said core of greater air-tempering capacity and operable to cause partially tempered fresh air to be drawn in through said passage and discharge through said cores in separate streams to the respective compartments.

11. An underseat unit for air-tempering the interior of an automobile having front and rear compartments and a seat therebetween spaced above the floor, comprising a casing adapted to be located in part between the seat and floor with a bottom portion below the floor provided with an end wall opening therein for reception of fresh air to said casing and having side and top walls above the floor and also end walls provided with openings for discharging air directly to said front and rear compartments, a pair of spaced heat-exchange cores adjacent said end wall openings including one of said cores having a greater air-tempering capacity than the other and extended below said floor and adjacent said end wall fresh air inlet opening therein, passage means comprising an apertured partition dividing the casing portions above and below the vehicle floor and extending through said floor communicating said fresh air inlet with the space between said cores, air impelling means between said cores for reception of fresh air forced through the lower portion of said core of greater air-tempering capacity and operable to cause partially tempered fresh air to be drawn in through said passage and discharged through said cores in separate streams to the respective compartments, and recirculated air inlet openings in the top wall of said casing so constructed and arranged that the air impelling means causes recirculated air to be blended with the fresh air supply and discharged in a combined stream therewith.

HOWARD J. FINDLEY.